United States Patent
Marc et al.

(10) Patent No.: US 9,188,261 B2
(45) Date of Patent: Nov. 17, 2015

(54) SAFETY CONNECTING DEVICE, IN PARTICULAR FOR PIPING, AN END-COUPLER FOR SUCH DEVICE, AND A METHOD FOR MANUFACTURING A NUT THEREFOR

(71) Applicant: JPB Systeme, Brie-Comte-Robert (FR)

(72) Inventors: Damien Marc, Nangis (FR); Gilles Le Gouill, Combs La Ville (FR); Jean-Philippe Rouland, Bonneuil sur Marne (FR)

(73) Assignee: JPB Systeme, Montereau sur le Jard (FR)

( * ) Notice: Subject to any disclaimer, the term of this patent is extended or adjusted under 35 U.S.C. 154(b) by 0 days.

(21) Appl. No.: 14/383,384

(22) PCT Filed: Mar. 7, 2013

(86) PCT No.: PCT/EP2013/054658
§ 371 (c)(1),
(2) Date: Sep. 5, 2014

(87) PCT Pub. No.: WO2013/132030
PCT Pub. Date: Sep. 12, 2013

(65) Prior Publication Data
US 2015/0028587 A1 Jan. 29, 2015

(30) Foreign Application Priority Data
Mar. 7, 2012 (FR) .................................... 12 52082

(51) Int. Cl.
*F16L 19/00* (2006.01)
*F16L 19/02* (2006.01)
*B21K 1/70* (2006.01)

(52) U.S. Cl.
CPC ............... *F16L 19/0231* (2013.01); *B21K 1/70* (2013.01); *F16L 19/005* (2013.01)

(58) Field of Classification Search
CPC .................... F16L 19/005; Y10T 29/49995
USPC ......................................... 285/92; 470/19, 20
See application file for complete search history.

(56) References Cited

U.S. PATENT DOCUMENTS

| 2,255,948 | A | * | 9/1941 | Swanstrom | ..................... 470/19 |
| 2,385,390 | A | * | 9/1945 | Tripp | ............................... 470/19 |
| 2,429,832 | A | * | 10/1947 | Luce | ............................... 470/19 |

(Continued)

OTHER PUBLICATIONS

European Patent Office; Search Report in International Patent Application No. PCT/EP2013/054658 dated Jul. 10, 2013; 2 pages.

(Continued)

*Primary Examiner* — David E Bochna
(74) *Attorney, Agent, or Firm* — Wood, Herron & Evans, LLP

(57) ABSTRACT

The device connects a first end-coupler with a second end-coupler, in particular of a piping. A nut is provided with a threaded bore in which the first end-coupler is screwed along a longitudinal axis. In a tightening position, the first end-coupler is in axial stress with a second end-coupler accommodated in the nut. Anti-rotation means are provided between the nut and at least one of the end-couplers to prevent relative rotation except when a torque exceeding a predetermined threshold is applied thereto. The anti-rotation means consist of at least one tab made in the material of the nut to lockingly interfere with substantially planar faces formed on the second end-coupler.

19 Claims, 4 Drawing Sheets

(56) References Cited

U.S. PATENT DOCUMENTS

Figure 1:
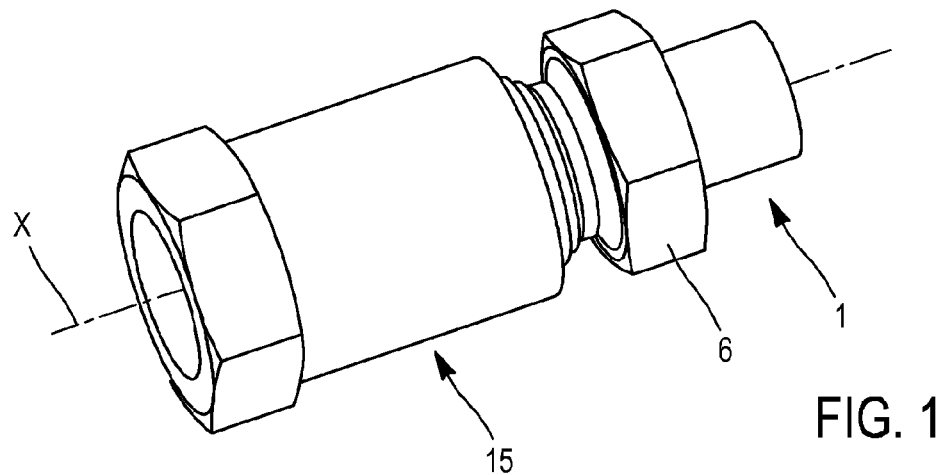

| | | | |
|---|---|---|---|
| 2,551,102 A * | 5/1951 | Delaney | 470/19 |
| 2,592,129 A * | 4/1952 | Engstrom | 470/19 |
| 5,083,819 A * | 1/1992 | Bynum | 285/92 |
| 5,215,336 A * | 6/1993 | Worthing | 285/92 |
| 5,350,200 A * | 9/1994 | Peterson et al. | 285/92 |
| 5,388,866 A * | 2/1995 | Schlosser | 285/92 |
| 5,823,702 A * | 10/1998 | Bynum | 285/87 |
| 6,857,665 B2 | 2/2005 | Vyse et al. | |
| 6,905,142 B2 * | 6/2005 | Do et al. | 285/92 |
| 7,571,937 B2 * | 8/2009 | Patel | 285/92 |
| 8,523,240 B2 * | 9/2013 | Murphy et al. | 285/92 |
| 8,641,099 B2 * | 2/2014 | Cuva et al. | 285/92 |
| 2006/0061094 A1 * | 3/2006 | Vyse et al. | 285/282 |
| 2007/0164566 A1 * | 7/2007 | Patel | 285/386 |

OTHER PUBLICATIONS

European Patent Office; International Preliminary Report on Patentability in International Patent Application No. PCT/EP2013/054658 dated Jun. 6, 2014; 6 pages.

* cited by examiner

SAFETY CONNECTING DEVICE, IN PARTICULAR FOR PIPING, AN END-COUPLER FOR SUCH DEVICE, AND A METHOD FOR MANUFACTURING A NUT THEREFOR

FIELD OF THE INVENTION

The invention relates to a safety connecting device, in particular between two piping end-couplers.

The invention also relates to an end-coupler for such a device.

The invention further relates to a method for manufacturing a nut intended to be part of the device.

STATE OF PRIOR ART AND RELATED PROBLEMS

The function of the connecting device is to provide for mechanical connection of a first end-coupler with a second end-coupler by means of a tightening nut, and to avoid the inopportune unscrewing between the elements, in particular in applications where the elements are subjected in operation to vibration or shaking.

The invention is directed more particularly but without limitation to standardized end-couplers of pipings to be connected, one of the end-couplers having a nipple intended to be pressed into a corresponding flare of the other end-coupler, for example a nozzle, under the action of tightening a nut being captive of one of the end-couplers and engaging a threading formed on the other end-coupler.

One of the end-couplers and the nut can include anti-rotation means and thereby exert the function of blocking elements which prevent the nut from being inopportunely unscrewed.

The blocking end-coupler may accordingly include, as an anti-rotation means, an area provided with several recesses, the term "recess" designating any hollow shape (as opposed to a relief or to an outer surface of the end-coupler). The recesses are typically distributed, especially evenly distributed at the periphery of the end-coupler over an angle of 360° about the longitudinal axis of the end-coupler. The recesses are intended to cooperate with anti-rotation means of the nut. Connecting devices are known provided with balls or movable pistons able to penetrate these recesses or to be extracted therefrom under the influence of a torque exceeding a given threshold. These means allow to oppose to the inopportune rotation between the elements for a torque lower than this threshold. However, these means are complex, costly, consisting of a multitude of elements and imply a long and delicate assembly. Further, they can generate dysfunctions in case of breakage, for example a jamming of a part in one of the recesses. This can prevent the elements from being desirably unscrewed.

According to U.S. Pat. No. 6,857,665 B2, a spring formed by a metal wire corrugated in a radial plane is housed in an inner peripheral groove of the nut. To prevent the inopportune unscrewing, lobes defined by the corrugations of the wire interfere with splines formed around the extremity of the end-coupler carrying the nut. The angular pitch of the lobes is different from that of the splines. Thus, the lobes interfere one after each other with a respective spline. Each time, a lobe which reaches the top of a spline is flattened and as a result, the circumferential dimension of the spring is elongated. This device does not allow an efficient locking because the angular pitch between two blocking positions is extremely small and the variation of the spring deformation energy between two blocking positions is low. The groove should be relatively deep and it weakens the nut.

PURPOSE OF THE INVENTION

One purpose of the invention is to overcome all or part of the preceding drawbacks.

Another purpose of the invention is to provide a simple and/or reliable and/or robust and/or ready to be assembled connecting device.

OBJECT(S) OF THE INVENTION

For that purpose, one object of the invention is a device for connecting a first end-coupler with a second end-coupler, in particular of a piping, in which:

the device comprises a nut provided at a first end with a threaded bore in which the first end-coupler is screwed along a longitudinal axis up to a tightening position in which the first end-coupler is in axial stress with a second end-coupler accommodated in the nut, the nut and the second end-coupler include axial bearing means to limit the axial displacement of the nut with respect to the second end-coupler in the nut screwing direction, the nut and both end-couplers each comprise a tubular body which undergoes said axial stress, one of the end-couplers and the nut are two mutual blocking elements comprising anti-rotation means including a protrusion belonging to one of the blocking elements and able to radially elastically penetrate at least one recess of the other blocking element, during a relative rotation between the nut and the blocking end-coupler, and to come out therefrom when a torque exceeding a determined threshold is applied to the nut, wherein the protrusion is part of an elastic tab which is formed in the material of the tubular body of one of the blocking elements.

Indeed, it has been found possible to make at least one elastic tab in the material of the tubular body of one of the blocking elements whereas this tubular body is on the other hand subjected to stresses, in particular axial stresses generated by screwing.

It has been in particular found advantageous to make relatively robust tabs having a great elastic stiffness and a relatively small elastic stroke. The locking effect obtained is better and the radial bulk of the device is decreased. This enables a high thickness of material to be retained in the tubular body equipped with tabs, as well as a high robustness to this tubular body accordingly.

Furthermore, the invention eliminates the need for manufacturing a further component equipped with tabs, and then installing this further component into a tubular body.

In an advantageous embodiment, the second end-coupler is one of the blocking elements.

Preferably, the connecting device comprises several tabs, distributed about the longitudinal axis.

On the nut, the anti-rotation means are preferably axially located between the threading of the nut and the bearing means.

In a preferred form, the at least one tab has as a substantially radial base linked to the tubular body, and a substantially axial end linked to the base by a bent portion.

The at least one tab, in particular the base of the at least one tab, can be linked to an annular rib of the tubular body. In this embodiment, there are preferably several tabs defined by material remaining between cut-outs of the rib.

In an advantageous embodiment, the at least one tab is an initially radial or oblique tab which was then formed by bending to extend nearly axially in the area adjacent to the protrusion.

The at least one tab can be of increased thickness in the vicinity of its end to form the protrusion. In another possible form, the protrusion is formed by the end of the tab, wherein this end can be of a non-increased thickness and/or, to better interfere with the recess, have a curvature or a corrugation.

Each tab can advantageously have a generally V shape, the base of each tab integral with the tubular body corresponding to the widest part of the tab, the protrusion being made in the narrower part of the tab and being oriented towards the longitudinal axis.

There can be provided between four and eight tabs distributed over 360° about the longitudinal axis, and quite a great number of recesses, for example two to four tens of recesses shaped to accommodate said protrusions. One of the advantages of the invention is to allow to make a great number of anti-rotation shapes and to multiply simultaneous or successive locking interactions for each relative angular position between both blocking elements.

Preferably, the nut includes at least one inner chamber, typically an annular one, enabling the at least one tab to move radially outwardly when radially disengaging from the at least one recess. It is advantageous that when the connecting device is in the connected state, the chamber is closed at each of its axial ends, for example by a proximity relation between both blocking elements. Thus, the anti-rotation device is sheltered from outside influences and dirt, and any debris occurring in the chamber is confined therein and cannot give rise to a breakdown.

Preferably, the anti-rotation means are located on a radially inner face of the tubular body of the nut and on a radially outer face of the tubular body of the second end-coupler. More particularly, at least one part of the at least one tab extends substantially parallel to the longitudinal axis within the nut whereas the at least one recess is shaped on the periphery of the blocking end-coupler.

When the at least one tab is formed on a radially inner face of the nut, it is particularly advantageous that it is completely located within the bore of the tubular body of the nut. Thus, the anti-rotation means are completely located and even confined within the nut when the connecting device is in the connected state.

According to another aspect of the invention, the end-coupler for a connecting device according to the first aspect is characterised in that it includes recesses having the form of faces arranged in a polygonal shape, preferably formed by material displacement which is axially operated starting from an end of the end-coupler.

It is particularly advantageous to operate the material displacement on an annular surface of the end-coupler which tapers at a relief angle towards said end.

According to a third aspect of the invention, the method for manufacturing a nut tubular body for a connecting device according to the first aspect is characterised in that during a step of boring the body, a radial rib is allowed to remain, cut-outs are formed in this rib to define tabs between the cut-outs, and the tabs are folded back by plastic deformation.

Preferably, the rib is annular and the tabs are folded back to assume a substantially axial orientation.

According to a fourth aspect of the invention, there is provided a locking device between two mutually rotating elements, to prevent both elements from rotating with respect to each other except in case a torque exceeding a determined threshold is applied, both rotating elements each comprising a body undergoing the torque and/or an axial stress resulting therefrom, both elements comprising anti-rotation means including a protrusion belonging to one of the elements and able to radially elastically penetrate at least one recess of the other element, during the relative rotation between both elements, and to come out therefrom when a torque exceeding a determined threshold is applied to at least one of the elements, characterised in that the protrusion belongs to an elastic tab which is formed in the material of the body of one of the elements.

In other words, the tab and the body form a single block of material.

Both elements can either be directly screwingly connected with each other, as a screw and a nut, or be involved in a screwed connection in which only one of the elements takes part, as in the case of the nut and the second piping end-coupler of the first aspect of the invention, where the second end-coupler has no threading.

Optional features of the first aspect, relating in particular to embodiments of tabs inside a bore of the body of one of the elements, and of recesses at the periphery of the other element, are transposable to this fourth aspect of the invention. The method according to the third aspect is usable to make one of the elements of the fourth aspect.

DETAILED DESCRIPTION OF THE INVENTION

Figure 2:
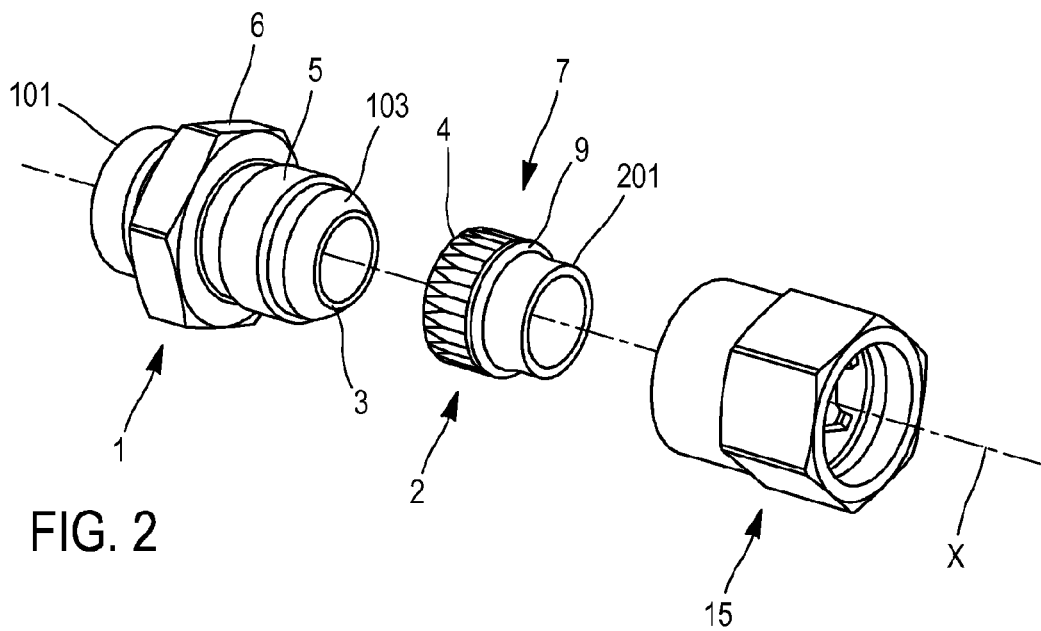
Figure 3:
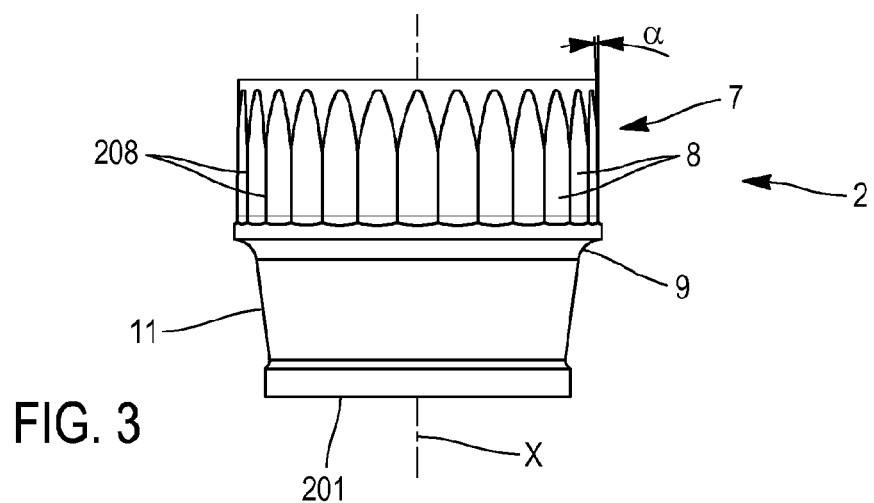
Figure 4:
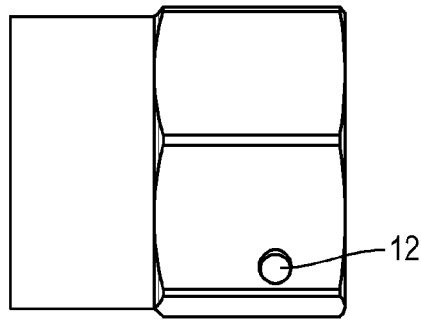
Figure 5:
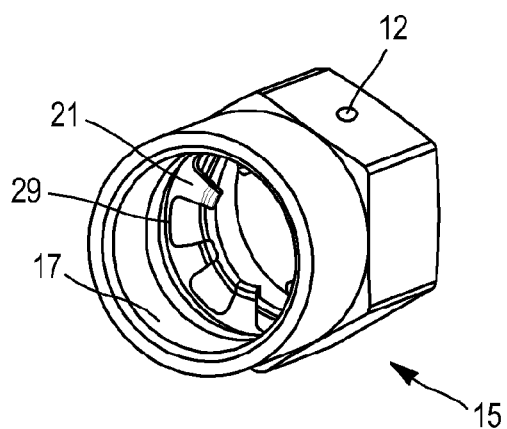
Figure 6:
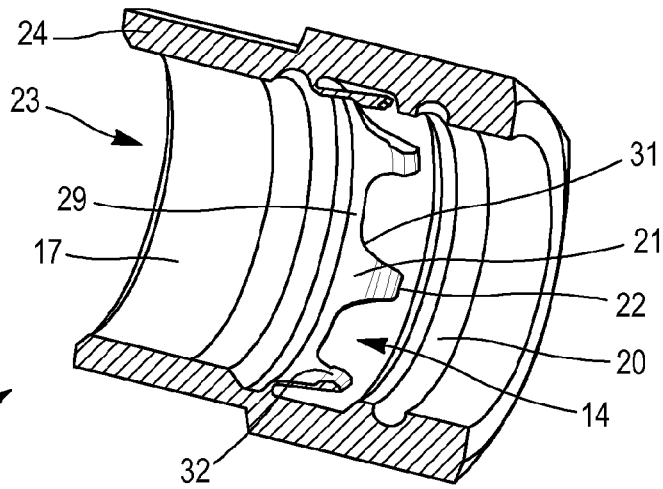
Figure 7:
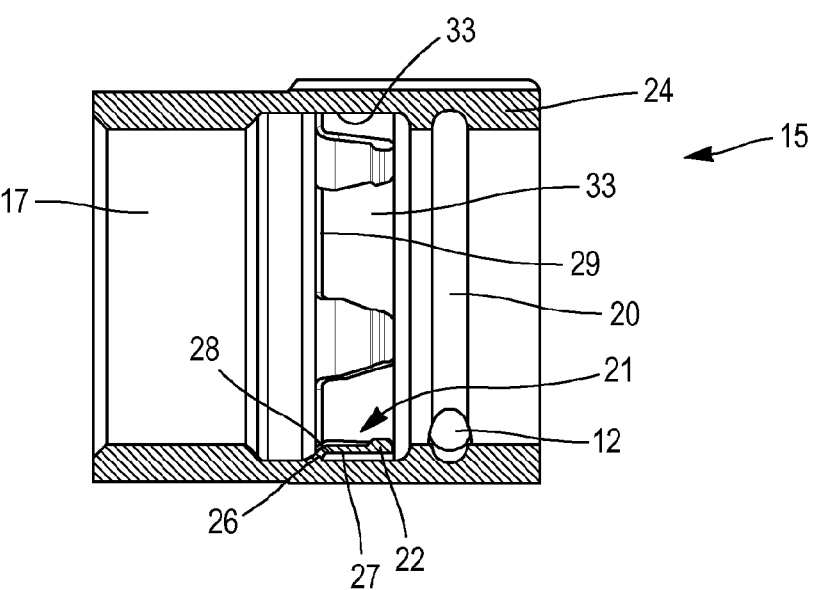
Figure 8:
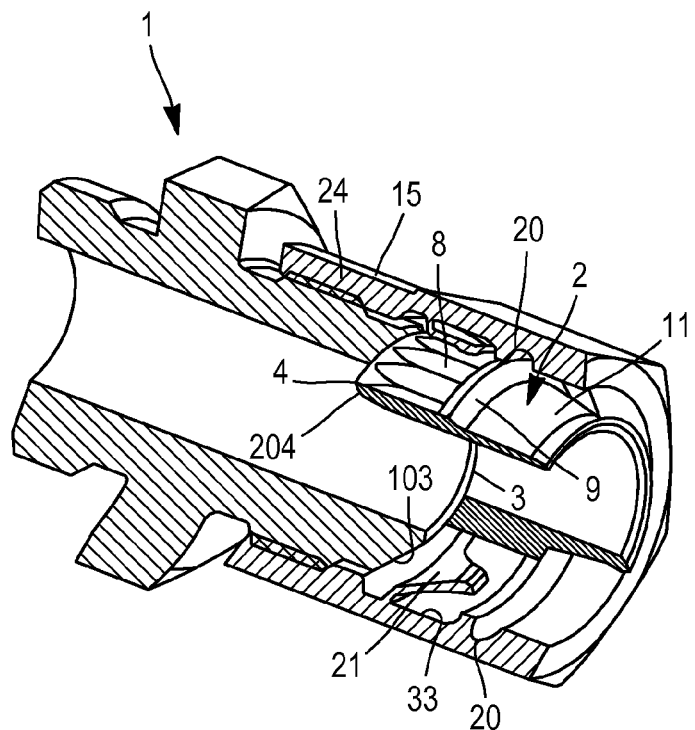
Figure 9:
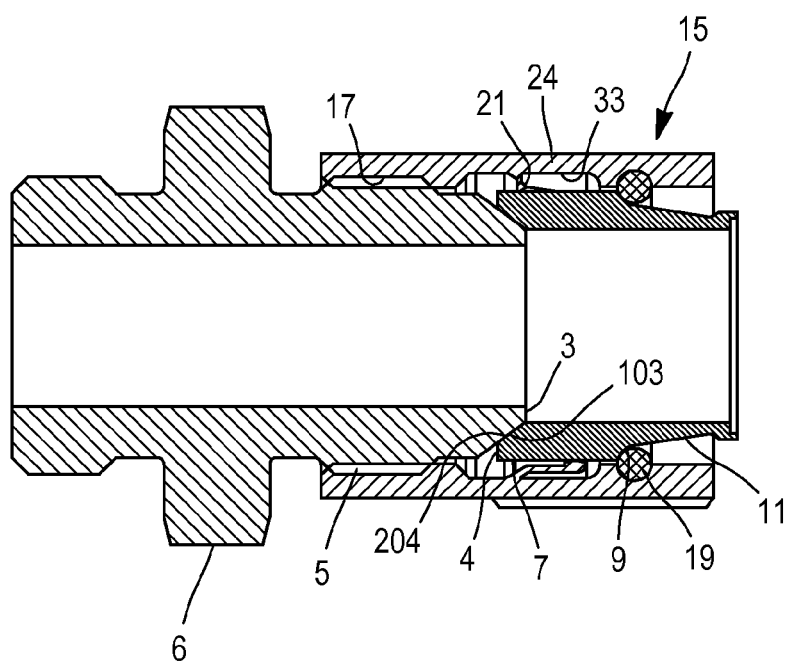
Figure 10:
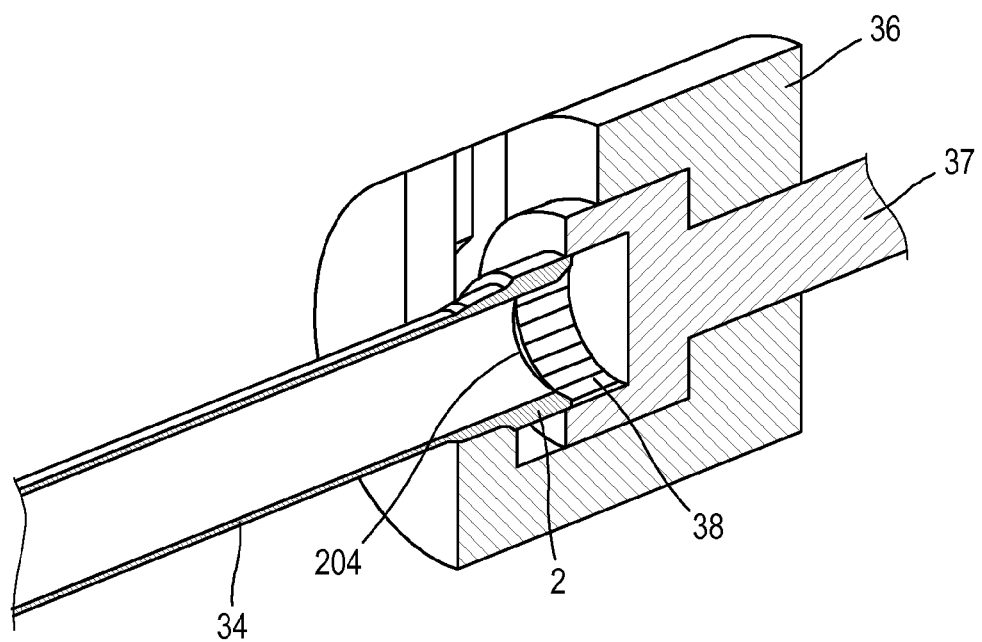

The invention will be better understood upon reading the following description relating to a non-limiting embodiment of the invention, and in light of the appended drawings wherein:

FIG. 1 is a perspective view of an embodiment of the locking device and of the connecting device according to the invention, FIG. 2 is an exploded perspective view of the device of FIG. 1, FIGS. 3 and 4 are elevation views of the second end-coupler and the nut, respectively, FIG. 5 is a perspective view of the nut at an intermediate manufacturing stage, FIGS. 6 and 7 are axial cross-section and perspective cross-section views of the nut, respectively, FIG. 8 is an axial perspective cross-section view of the connecting device in the connected state, FIG. 9 is an axial cross-section view of the device in the connected state, and FIG. 10 is an axial perspective cross-section view showing a step of forming anti-rotation recesses on the second end-coupler.

Since this embodiment is in no way limiting, alternatives of the invention could in particular be contemplated comprising only a selection of features described in the following, isolated from other described features, if this selection of features is sufficient to provide a technical advantage or to differentiate the invention from the prior art. This selection comprises at least one preferably functional feature without structural details, or with only part of the structural details if this part only is sufficient to provide a technical advantage or to differentiate the invention from the prior art.

The connecting device comprises a first end-coupler 1 and a second end-coupler 2 which are typically end-couplers mounted on facing ends of two piping segments which must be connected to each other. The end-couplers are tubular to ensure continuity in the piping. In the assembled state, both end-couplers extend along a common longitudinal axis X.

Each of the end-couplers 1, 2 comprises a back end 101, 201 intended to be secured, for example welded, to the end of the respectively associated piping segment (not shown). Front ends 3, 4 of both end-couplers, opposite to their back ends 101, 201, are intended to be sealingly pressed against each other under the effect of an axial compression, so as to connect both piping segments.

For this axial compression, the device comprises a nut 15 having an inner threading 17. Both end-couplers 1, 2, and the nut 15 each comprise a typically metal, specially of stainless steel, tubular body, which is under stress, in particular axial stress when the nut is tightened.

In the example represented, the first end-coupler 1 comprises at its front end 3 an ovoid shaped nipple 103 intended to be pressed in a tapered flare 204 (FIG. 9) formed at the front end 4 of the second end-coupler 2. The assembly of the nipple 103 under axial compression in the flare 204 is intended to ensure a sealed connection between both end-couplers 1, 2.

From the nipple 103, the first end-coupler 1 comprises a male threading 5 and then a flange carrying on its periphery a rotary engagement shape 6 such as a hexagonal shape.

Axial bearing means 9, 20 are provided on the second end-coupler 2 and the nut 15 to enable the nut 15 to axially bias and stress the second end-coupler 2 against the first end-coupler 1 by screwing the nut 15 on the threading 5 of the first end-coupler.

In the example represented, on the radially outer surface of its tubular body, the second end-coupler 2 comprises as the bearing means, a shoulder 9 having for example a planar, conical or concave toroidal shape, located between a front outer annular wall 7 close to the front end 4 and a back outer annular wall 11 having a smaller diameter.

The axial bearing means of the nut 15 comprise a radially inner projection made in the bore of the tubular body of the nut to press against the shoulder 9.

In the example more particularly represented, this projection is a thrust ring 19 (FIG. 9) accommodated in an annular groove 20 formed in the bore of the tubular body. The thrust ring 19 is formed by a steel wire segment having a length approximately equal to the perimeter of the groove 20 about the axis X. The steel wire is introduced into the groove 20 by a piercing 12 made through the tubular body of the nut and opening into the groove 20.

For the assembly of the connecting device, the second end-coupler 2 is welded to the corresponding end of the piping, the end-coupler 2 is slid through the bore of the nut 15, in the direction where the end-coupler first passes through the groove 20 and then through the inner threading 17 of the nut. When the shoulder 9 of the end-coupler 2 has reached the groove 20, the thrust ring 19 is placed. After this, the nut 15 is captive behind the shoulder 9 on the piping associated with the end-coupler 2.

During screwing the inner threading 17 of the nut 15 onto the outer threading 5 of the end-coupler 1, the thrust ring 19 is pressed against the shoulder 9 of the end-coupler 2 and biases the end-coupler 2 into axial bearing against the end-coupler 1, and more particularly, in the example, the flare 104 into bearing against the nipple 103.

According to the invention, one of the end-couplers and the nut are blocking elements capable of cooperating with each other to prevent the nut from being inopportunely untightened. For this, both blocking elements have anti-rotation means capable of cooperating to prevent the nut from being undesirably rotated with respect to the other blocking element. Preferably, as in the embodiment represented, the end-coupler having this blocking function is the second end-coupler 2. To that end, the wall 7 is provided with several recesses 8 angularly distributed at the periphery of the second end-coupler, about the longitudinal axis X. The recesses designate any hollow shape with respect to a relief (ridges, teeth, notches) or to an outer surface of the end-coupler. In the example illustrated, these recesses have the form of faces or planar facets or flats arranged in a polygonal shape (in particular with several tens of facets as represented, typically 20 to 40 facets): the recess is formed by a central area of each face which is set back to the axis of the end-coupler with respect to the ridges 208 separating the faces 8 and with respect to the ideal revolution surface passing through the ridges 208 of the end-coupler 2. In alternatives of the invention not represented, these recesses can have various shapes, such as variously profiled splines extending along the longitudinal axis of the end-coupler.

The annular wall 7 has a generally substantially cylindrical shape, yet with a low relief angle "a" towards the front end 4 which is thus slightly narrowed. Thus, the recesses 8 taper as petals towards the end 4 and do not reach this end exactly. This enables the recesses 8, and in particular the planar facets 8, to be easily made, by material displacement as will be described in further details later, in reference to FIG. 10. As the anti-rotation means, the recesses 8 are intended to cooperate with further anti-rotation means 14 provided inside the nut 15 in an axial area which is located facing the recesses 8 when the connecting device is in the connected state.

In the preferential example described, where the anti-rotation means are located on the second end-coupler and more particularly in the axial area included between the front end 4 of the second end-coupler and its axial bearing means (consisting of the shoulder 9), the anti-rotation means 14 of the nut 15 are located in an axial area included between the inner threading 17 and the axial bearing means (consisting of the groove 20 and the ring 19) of the nut 15.

The anti-rotation means 14 of the nut 15 comprise elastic tabs 21 the ends of which form protrusions 22 which occupy at rest, in the bore 23 of the tubular body 24, an axial and radial position such that these protrusions 22 will interfere with the anti-rotation means 8 of the second end-coupler 2. This interference generates an elastic flexure of the tabs. Said flexure is slight when a protrusion 22 is pressed substantially in the middle of the circumferential dimension of a facet 8. But said flexure becomes much higher, in terms of flexural stress, in a tab the protrusion of which overrides a ridge 208 between two facets 8 during the rotation of the nut.

Thus, when no torque is exerted on the nut 15, the latter tends to be immobilized in an angular position where the protrusions 22 are in contact with the facets 8 substantially in the middle of their circumferential dimension. To rotate the nut, a torque exceeding some predetermined threshold should be exerted, being sufficient for the protrusions 22 to override the ridges 208 at the expense of a corresponding flexure of the tabs 21.

The angular pitch between two successive tabs 21 is typically a multiple of the angular pitch between the facets 8 about the axis X.

According to the invention, each elastic tab 21 is formed in the material of the tubular body 24 of the blocking element equipped with anti-rotation protrusions, this blocking element being in the example represented the second end-coupler 2. This means that the tubular body and the tab belong to a same material block, such as a stainless steel block.

Each tab 21 (FIG. 7) has a substantially radial or oblique base 26 with respect to the axis X, linked to the tubular body 24, and a substantially axial rod 27 forming the protrusions 22 at its free end. The rod 27 is linked to the base 26 by a bent portion 28.

Preferably, as represented, each tab 21 is linked to an annular rib 29 of the tubular body 24. The tabs 21 are defined by material remaining between cut-outs 31 of the rib 29.

As illustrated in FIG. 5, the manufacture has a step where the tabs 21 radially extend relative to the tubular body 24, more particularly in a radial plane. Then, the tabs are formed by bending for their rod to extend approximately axially in the area adjacent to the protrusion.

To produce the tubular body at its semi-finished product state as represented in FIG. 5, a bore having a small diameter corresponding to the central hole of the rib is first machined, and then each of both parts of the bore is machined at its diameter, located on either side of the rib 29, each from the corresponding end of the nut, such that the rib is allowed to remain between both half-bores thus made. Then, the cut-outs 31 are machined.

Preferably, as represented in 32 in FIG. 6, each tab 21 is of increased thickness in the vicinity of its end forming the protrusion 22.

Each tab 21 preferably has a generally V shape, tapering from the base 26 towards the protrusion 22.

Preferably, the nut 15 includes at least one inner chamber 33 enabling the at least one tab 21 to be radially displaced outwardly in order to be radially disengaged from the at least one recess 8. Preferably, this annular chamber is closed at each of its axial ends by a proximity relation between an outer annular surface of the end-coupler 2 and an inner annular surface of the nut 15.

In the preferred configuration which is represented, the rod 27 of the tab 21 extends substantially parallel to the longitudinal axis X within the nut 15. This enables to have tabs in relatively high numbers with respect to the inner diameter of the nut or more generally with respect to the diameter of the wall to which the tabs are linked.

When, as in the example described, the tabs are linked to a radially inner face of the nut, it is very advantageous that each tab 21 is completely located within the bore 23 of the tubular body 24 of the nut.

The faces 8 are advantageously formed by a material displacement which is operated axially starting from an end, herein the front end 204 of the end-coupler. FIG. 10 represents an assembly therefor. The end-coupler 2 already welded to its piping 34 is fixedly positioned in a support 36 wherein a material displacement tool 37 is slidable along the axis X. The active face 38 of the tool is a female prismatic surface which comes and caps the end 204 of the end-coupler 2. For material displacement, the tool is advanced along the axis X such that the faces of the prismatic surface of the tool form the desired facets 8 for the end-coupler.

Preferably, the annular surface 7 of the end-coupler, on which the material-displacement is operated, is tapered at a relief angle "a" towards said end 204. This makes the material-displacement work easier.

The invention claimed is:

1. A device for connecting first and second sections of a piping, comprising:
   a first end-coupler couplable with the first piping section;
   a second end-coupler couplable with the second piping section; and
   a nut provided at a first end with a threaded bore;
   wherein the second end-coupler is received in the nut and the first end-coupler is screwed along a longitudinal axis up to a tightening position wherein the first end-coupler is in axial stress with the second end-coupler;
   the nut and the second end-coupler including respective axial bearing means to limit the axial displacement of the nut with respect to the second end-coupler in the nut screwing direction;
   the nut and both end-couplers each comprise a tubular body which undergoes the axial stress;
   one of the first or second end-couplers and the nut defining respective mutual blocking elements comprising anti-rotation means including at least one protrusion on one of the blocking elements and at least one recess on the other blocking element;
   the at least one protrusion able to radially elastically penetrate the at least one recess during a relative rotation between the nut and the blocking end-coupler, and to come out therefrom when a torque exceeding a determined threshold is applied to the nut;
   wherein the at least one protrusion extends from at least one elastic tab which is formed from the material of the tubular body of one of the blocking elements; and
   wherein, in an installed condition, the at least one tab and the at least one recess are disposed completely within the bore of the nut.

2. The connecting device according to claim 1, wherein the second end-coupler is one of the blocking elements.

3. The connecting device according to claim 2, wherein the anti-rotation means on the second end-coupler are located between a front end of the second end-coupler, directed towards the first end-coupler, and the axial bearing means of the second end-coupler.

4. The connecting device according to claim 1, comprising several tabs, distributed about the longitudinal axis.

5. The connecting device according to claim 1, wherein the anti-rotation means on the nut are axially located between the threading of the nut and the bearing means of the nut.

6. The connecting device according to claim 1, wherein the at least one tab is of increased thickness in the vicinity of its end to form the protrusion.

7. The connecting device according to claim 1, comprising between four and eight tabs distributed over 360 degrees about the longitudinal axis, and between twenty and forty recesses shaped to accommodate said protrusions.

8. The connecting device according to claim 1, wherein the nut includes at least one inner chamber enabling the at least one tab to be radially displaced outwardly in order to be radially disengaged from the at least one recess.

9. The connecting device according to claim 1, wherein the at least one tab is formed on a radially inner face of the nut and is completely located within the bore of the tubular body of the nut.

10. The connecting device according to claim 1, wherein recesses on the first or second end-coupler have the form of faces arranged in a polygonal shape.

11. The end-coupler according to claim 10, wherein the faces are formed by material displacement in an axial direction of the end-coupler, starting from an end of the end-coupler.

12. The end-coupler according to claim 11, wherein the material displacement is performed on an outer surface of the end-coupler which tapers at a relief angle towards the end.

13. A device for connecting first and second sections of a piping, comprising:
   a first end-coupler couplable with the first piping section;
   a second end-coupler couplable with the second piping section; and
   a nut provided at a first end with a threaded bore;
   wherein the second end-coupler is received in the nut and the first end-coupler is screwed along a longitudinal axis up to a tightening position wherein the first end-coupler is in axial stress with the second end-coupler;

the nut and the second end-coupler including respective axial bearing means to limit the axial displacement of the nut with respect to the second end-coupler in the nut screwing direction;

the nut and both end-couplers each comprise a tubular body which undergoes the axial stress;

one of the first or second end-couplers and the nut defining respective mutual blocking elements comprising anti-rotation means including at least one protrusion on one of the blocking elements and at least one recess on the other blocking element;

the at least one protrusion able to radially elastically penetrate the at least one recess during a relative rotation between the nut and the blocking end-coupler, and to come out therefrom when a torque exceeding a determined threshold is applied to the nut;

wherein the at least one protrusion extends from at least one elastic tab which is formed in the material of the tubular body of one of the blocking elements; and wherein the at least, one tab has a substantially radial or oblique base linked to the tubular body, and a substantially axial rod linked to the base by a bent portion.

14. The connecting device according to claim 13, wherein each tab tapers from its base towards the protrusion.

15. A device for connecting first and second sections of a piping, comprising:

a first end-coupler couplable with the first piping section;

a second end-coupler couplable with the second piping section; and a nut provided at a first end with a threaded bore;

wherein the second end-coupler is received in the nut and the first end-coupler is screwed along a longitudinal axis up to a tightening position wherein the first end-coupler is in axial stress with the second end-coupler;

the nut and the second end-coupler including respective axial bearing means to limit the axial displacement of the nut with respect to the second end-coupler in the nut screwing direction;

the nut and both end-couplers each comprise a tubular body which undergoes the axial stress;

one of the first or second end-couplers and the nut defining respective mutual blocking elements comprising anti-rotation means including at least one protrusion on one of the blocking elements and at least one recess on the other blocking element;

the at least one protrusion able to radially elastically penetrate the at least one recess during a relative rotation between the nut and the blocking end-coupler, and to come out therefrom when a torque exceeding a determined threshold is applied to the nut;

wherein the at least one protrusion extends from at least one elastic tab which is formed in the material of the tubular body of one of the blocking elements; and wherein the at least one tab is linked to an annular rib of the tubular body.

16. The connecting device according to claim 15, comprising several tabs defined by material remaining between cut-outs of the rib.

17. A device for connecting first and second sections of a piping, comprising:

a first end-coupler couplable with the first piping section;

a second end-coupler couplable with the second piping section; and a nut provided at a first end with a threaded bore;

wherein the second end-coupler is received in the nut and the first end-coupler is screwed along a longitudinal axis up to a tightening position wherein the first end-coupler is in axial stress with the second end-coupler;

the nut and the second end-coupler including respective axial bearing means to limit the axial displacement of the nut with respect to the second end-coupler in the nut screwing direction;

the nut and both end-couplers each comprise a tubular body which undergoes the axial stress;

one of the first or second end-couplers and the nut defining respective mutual blocking elements comprising anti-rotation means including at least one protrusion on one of the blocking elements and at least one recess on the other blocking element;

the at least one protrusion able to radially elastically penetrate the at least one recess during a relative rotation between the nut and the blocking end-coupler, and to come out therefrom when a torque exceeding a determined threshold is applied to the nut;

wherein the at least one protrusion extends from at least one elastic tab which is formed in the material of the tubular body of one of the blocking elements; and wherein the at least one tab is an initially radial or oblique tab which was then formed by bending to extend nearly axially in the area adjacent to the protrusion.

18. A method for making a nut tubular body for a connecting device for connecting first and second piping sections, the method comprising: boring through a tubular body, during boring the body, allowing a radial rib to remain in the bore, forming cut-outs in the rib to define tabs between the cut-outs, and folding back the tabs by plastic deformation.

19. The method according to claim 18, wherein the rib is annular and the tabs are folded back to assume a substantially axial orientation.

* * * * *